United States Patent [19]
Clemons

[11] Patent Number: 5,934,208
[45] Date of Patent: Aug. 10, 1999

[54] DEPTH CONTROL STRUCTURE FOR SEED DRILLS

[76] Inventor: Lester L. Clemons, 1333 E. Oak St., Othello, Wash. 99344

[21] Appl. No.: 09/032,817

[22] Filed: Mar. 2, 1998

[51] Int. Cl.[6] ................................................ A01C 5/06
[52] U.S. Cl. ........................................ 111/135; 111/164
[58] Field of Search ............................ 111/52, 134, 157, 111/163, 164, 165, 135

[56] References Cited

U.S. PATENT DOCUMENTS

| | | | |
|---|---|---|---|
| 3,611,956 | 10/1971 | Moore | 111/62 |
| 3,749,035 | 7/1973 | Cayton et al. | 172/4 X |
| 4,176,721 | 12/1979 | Poggemiller et al. | 172/4 |
| 4,333,534 | 6/1982 | Swanson et al. | 172/464 |
| 4,506,609 | 3/1985 | Fuss et al. | 111/52 |
| 4,624,196 | 11/1986 | Anderson | 111/52 |
| 4,913,070 | 4/1990 | Morrison, Jr. | 111/135 |
| 5,461,993 | 10/1995 | Ikumoto et al. | 111/52 |

*Primary Examiner*—Christopher J. Novosad
*Attorney, Agent, or Firm*—Keith S. Bergman

[57] ABSTRACT

A depth control structure for an agricultural seeder, having laterally spaced opener structures including pivotally mounted opener beams extending rearwardly and downwardly from the seeder frame to journal openers for vertical motion, provides a depth control wheel adjustably supported forwardly of each opener. Each depth control wheel is journaled in the rearward portion of a body beam pivotally supported in its forward portion on the seeder to extend rearwardly with at least its rearward portion below the associated opener beam. The medial portion of the body carries adjustment structure interconnected with the superior opener support beam to fixedly maintain and adjustably vertically position the depth control wheel relative to the associated opener. The depth control wheels have a cylindrical periphery with substantial width to aid in compacting and conditioning the earth that is to define a potential seed furrow for seed placement. The depth wheel moves vertically responsive to vertical motion of the associated opener to provide uniform placement depth for seeds.

6 Claims, 4 Drawing Sheets

DEPTH CONTROL STRUCTURE FOR SEED DRILLS

BACKGROUND OF INVENTION

RELATED APPLICATION

There are no applications related hereto heretofore filed in this or any foreign country.

FIELD OF INVENTION

This invention relates generally to agricultural seed drills, and more particularly to depth control structure for seed placement that has a depth control and packer wheel supported immediately forwardly of each seed furrow opener for vertical motion responsive to vertical motion of the associated opener.

BACKGROUND AND DESCRIPTION OF PRIOR ART

Various agricultural crops that are reproduced from seed are quite sensitive to the depth of implantation of their seeds for production of an optimum crop. If the seeds are too close to the covering surface of a seed bed, they may not have sufficient moisture to germinate or sufficient protective cover to grow and properly develop after germination. In some soil types such seeds may not even be positionally maintained but may be removed or may migrate by reason of environmental factors. If seeds are planted too deeply, they may not develop and emerge after germination, their emergence may be substantially delayed from that of seeds planted at a proper depth and if they emerge they may have substantial loss of vigor. If seeds planted too deeply survive, their depth of implantation may cause plants developed from them to provide less yield than their maximum potential, to be less able to compete with more mature plants, weeds or other non-productive vegetation, to be more susceptible to disease and insect damage and to be slower in maturing.

These problems have heretofore been recognized, their causes analyzed and various mechanisms and systems developed to attempt to alleviate or relieve various of them. Unfortunately, however, the factors involved in placing seeds at proper uniform depth with mechanical seeders in field environments are many and varied and though proposed solutions have been correspondingly numerous, problems still remain with control of the depth of seed placement. The instant invention seeks to provide a new, novel and improved system for regulating the depth of seed placement to better solve various of the problems associated therewith, especially for seeds that require placement at relatively shallow depth in tilled seed beds that have reasonably flat typography to accept ordinary linear seed drills.

In their inception, mechanical seeders generally provided a horizontal frame, supported completely on wheels or partially on wheels and partially on a propelling vehicle, with a plurality of depending seed placement structures to transit over the earth. As the depth of seed placement became of more concern, seeders became more complex to deal with the problem and in general provided more sophisticated depth gauging and positioning functions originally associated with the frame and later associated with each seed placement and opening element, because the problems associated with non-uniform depth of seed placement commonly are different with each seed placing structure. As seeding devices further developed many were provided with mechanism to sense the depth of penetration of the seed placing structures into the earth, most commonly by sensing resistive pressure upon those structures, and individual means were provided to responsively regulate this pressure to a uniform average, generally by either spring or hydraulic biasing.

Though such mechanisms have become both quite sophisticated and complex, the resistance to the penetration of seed placing structure, and particularly angulated colter disk type structures, is not determinative of nor even directly related to the depth of seed placement and has provided variant results for a variety of reasons. The earth over which a seeder passes commonly is not uniform or homogeneous, either in its surface typography or in the physical nature of the soil forming it, so the resistive pressure to soil penetration may, and commonly does, vary with other conditions that can have as great or greater effect than the resistive force to colter penetration on the actual depth of seed placement. I have found that there is a substantial variance of the depth of seed placed with many sophisticated types of depth gauging seeders that sense resistive pressure to soil penetration, as evidenced by the varying results observed in crops placed by such seeders that are caused by variant seed placement depth.

This problem heretofore has been recognized to some extent and responsively the beds in which agricultural seeds are to be placed have been better prepared where the seeds are particularly sensitive to depth of placement. The bed preparation has been improved both as to uniformity of a flat surface that at least is of a ruled nature formed by ruling lines as long as the width as a seeder to be used on it, and as to uniformity of tillage to provide a bed that is reasonably homogeneous over substantial areas.

My depth control structure takes advantage of this change to provide a depth control wheel associated with each seeder opener in a position immediately forwardly of the opener as opposed to depth control wheels that commonly have been rearwardly of the opener. Each of the instant depth control wheel is journaled on a support forwardly of the depth control wheel to extend in an angulated fashion rearwardly and downwardly with the depth control mechanism supported on the beam supporting the associated opener, in a medial position between the pivotal support of the opener beam and the opener carried by that beam. Such depth control structure has been found to produce very uniform seed placement depth in general and especially for small seeds required to be placed at shallow depths of between one-eighth and one-half an inch such as grass, alfalfa, cereal grains and other seeds grown under marginal moisture conditions.

The instant depth control wheel provides other additional benefits that distinguish it from prior depth gauging structures. The depth control wheel is of a substantial width, greater than the maximum lateral width of the associated opener structure at its journal, and with the depth control wheel positioned forwardly of the opener it tends to level and consolidate the earth surface over which it moves to create a more homogeneous area for seed deposition by the associated following opener.

Additionally the control structure is an independent, self-contained structure that may be added to many common seeders of present day commerce without modification, whereas the more sophisticated prior devices normally required a particular seeder construction for their use and often have not been used because there was not sufficient demand for various particular seeder constructions. The instant depth control wheels also are sufficiently spaced from each other that they do not compact and make uniform the surface area between the areas traversed by two adjacent wheels to allow irregularity in the earth surface to aid in preventing windblown erosion in fine and easily moved soils. My depth control structure also is easily and simply installed by unsophisticated mechanics as it does not require any modification of the existing seeder structure by cutting, drilling, welding or the like, but is operatively interconnected merely by bolt operated fasteners.

My invention resides not in any one of these features individually, but rather in the synergistic combination of all of its structures that necessarily give rise to the functions flowing therefrom as herein specified and claimed.

SUMMARY OF INVENTION

My depth control structure provides an elongate support beam pivotally carried at least in its medial portion by an opener beam spacedly forwardly of the opener disks it journals to extend rearwardly in a downwardly angulated orientation to journal a depth control wheel spacedly forwardly of the associated opener disks. Adjustment structure communicates from the medial portion of the support beam upwardly for structural support on the opener beam supporting the associated opener disk to provide vertical adjustment and positional maintenance of the depth control wheel relative to the opener. The adjustment structure is of a mechanically linked screw type that does not provide automatic vertical adjustment except in response to actual vertical motion of the associated opener disk.

In providing such mechanism, it is:

A principal object to provide a depth control structure for a seeder that has a ground contacting depth control wheel associated with each seeder opening disk in a position immediately forwardly thereof.

A further object is to provide such a structure that is self contained and may be embodied in many existing seeders of present commerce as an add-on mechanism without any required modification of either seeder or depth control structure.

A further object is to provide such a structure that has a depth control wheel that is vertically adjustable but continuously mechanically supported in a particular vertical position relative to an associated opener disk.

A still further object is to provide such a structure that has fasteners for attachment to existing seeder frames that do not require structural modification of those seeder frames and that may be easily installed, removed and adjusted by mechanically unsophisticated workmen.

A still further object is to provide such a structure that continuously provides consistent placement of seeds by a commercial seeder at a particular predetermined depth with very substantial uniformity, especially at shallow depths of one-eighth to one-half inch.

A still further object is to provide such a depth control structure that is of new and novel design, of rugged and durable nature, of simple and economic manufacture and one otherwise well adapted to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement, with only one preferred and practical embodiment of the best known mode being illustrated in the accompanying drawings and specified as required.

BRIEF DESCRIPTION OF DRAWINGS

In the accompanying drawings which form a part hereof and wherein like numbers of reference refer to similar parts throughout.

DESCRIPTION OF PREFERRED EMBODIMENT

Figure 1:
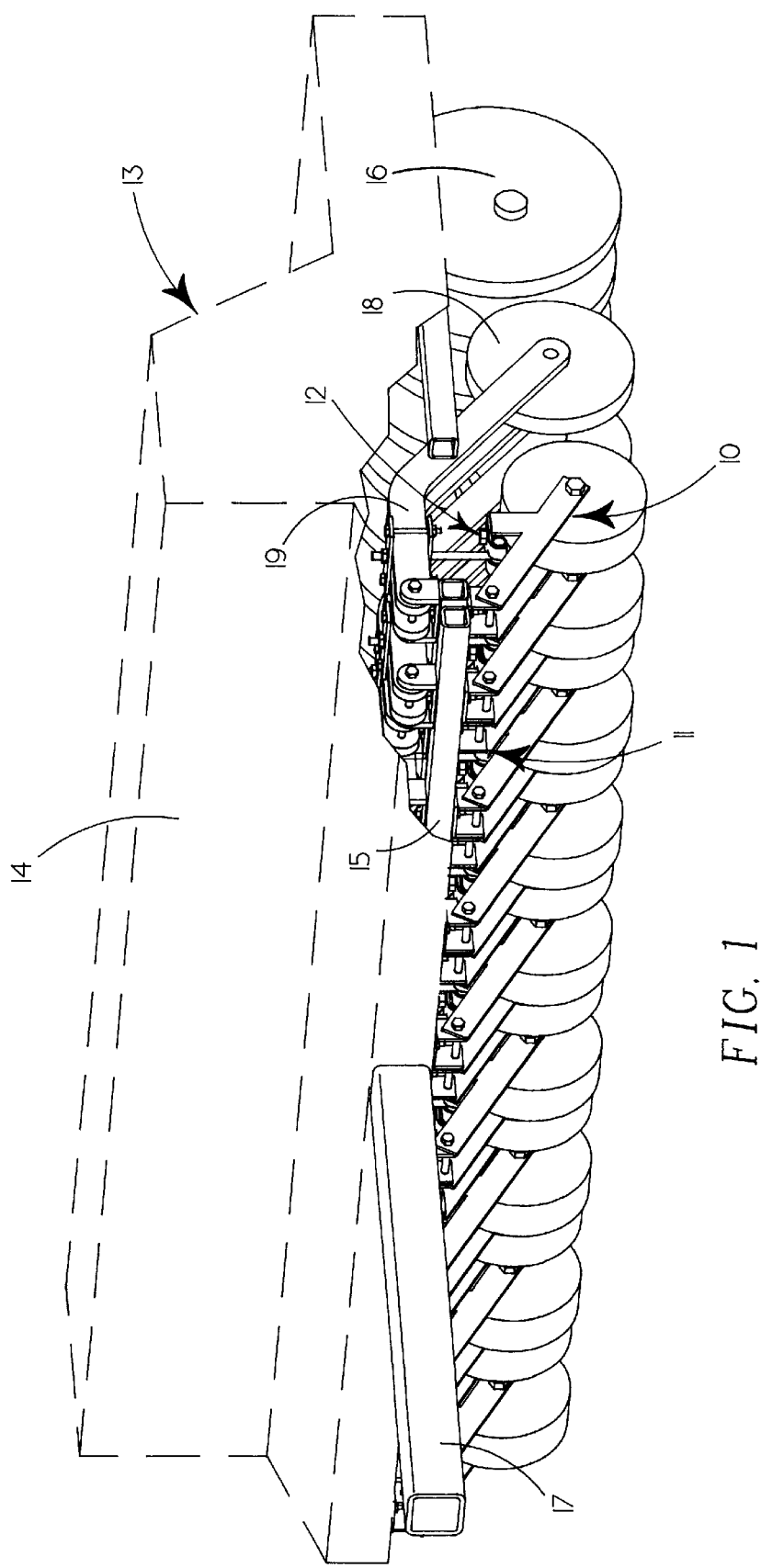
FIG. 1 is an isometric view of a plurality of my depth control structures in place on a seeder.
Figure 2:
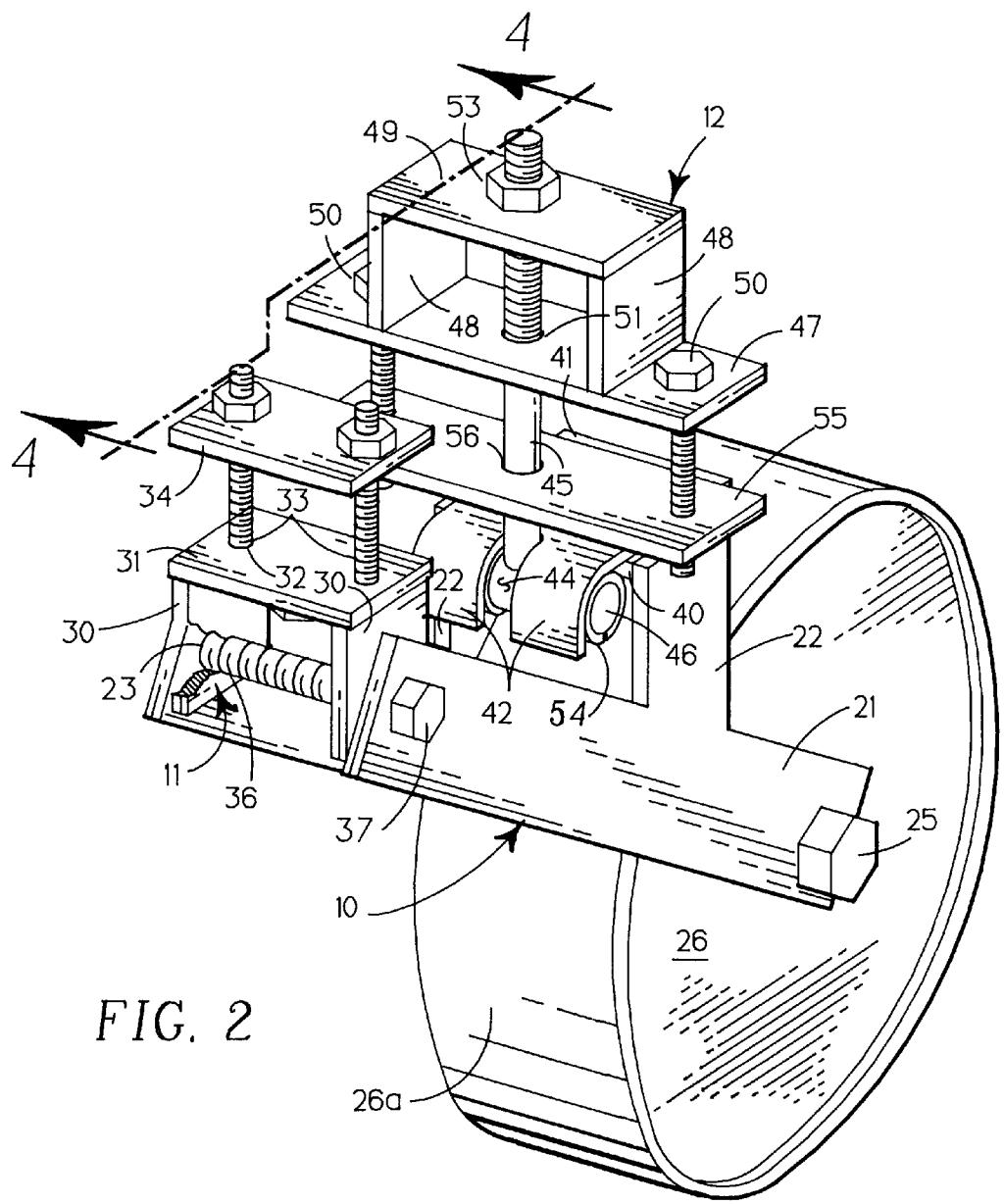
FIG. 2 is an enlarged rearwardly and downwardly looking isometric view of a depth control structure of FIG. 1 isolated from the supporting seeder to show various of its parts, their configuration and relationship.
Figure 3:
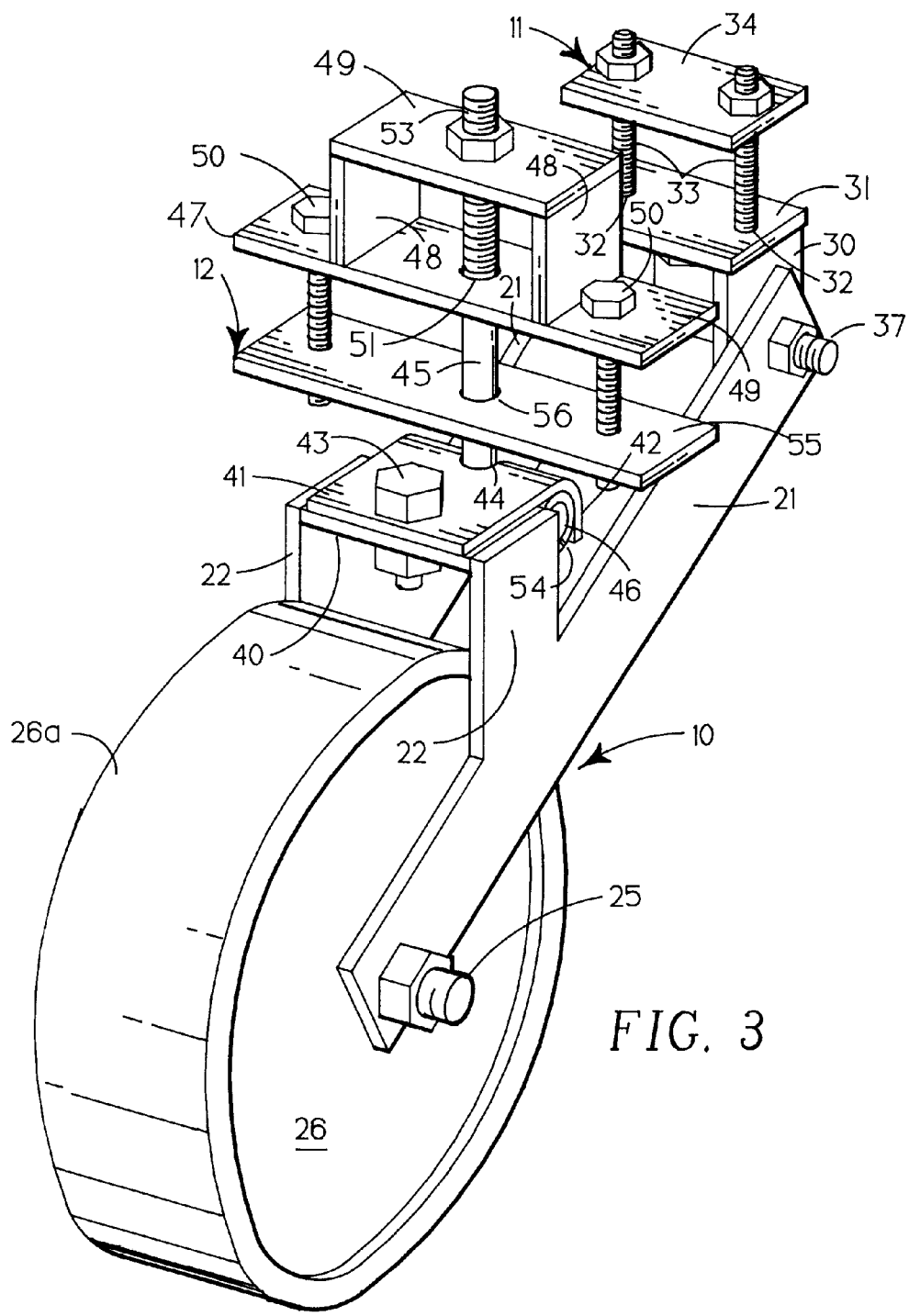
FIG. 3 is an enlarged downwardly and forwardly looking isometric view from a different viewpoint of a depth control structure of FIG. 1, isolated from the supporting seeder to show various of its features from this aspect.

Depth control structure for each opener of a seed drill 13 provides generally body 10 carried in its forward portion by forward pivotal mounting structure 11 and positionally maintained in its medial portion by medial adjustment structure 12.

Seeder 13 provides a laterally elongate body 14 having a peripherally defined frame 15, with at least one forward laterally extending beam 15a, interconnecting various secondary interior frame elements. The particular seeder illustrated is supported in its rearward portion by wheels 16 and in its forward portion by tongue 17 attached to some propelling vehicle (not shown) for both vertical positioning and locomotion over the earth. The medial portion of the frame 15 supports a plurality of similar laterally spaced openers 18 comprising pairs of disks in convex orientation and angulated to each other to rotate to open a furrow for placement of seed. The openers 18 are supported on opener beams 19 formed by two similar spaced elements that are attached to each other to provide a rearward yoke structure to mount the opener. The opener beams are angulated and pivotally mounted in their forward portions by brackets 20 carried by seeder frame 15 to extend rearwardly and downwardly to mount the journaled opener in appropriate operative position, commonly for biased vertical motion. This essential structure is common to many seeders of modern commerce and it is with such seeders that my depth control structure is operative.

Body 10 of my depth control structure provides two similar spaced side beams 21, each having medial, upwardly extending adjustment leg 22. The forward end portions of the side beams each define similar fastener holes 23 to accept a bolt therethrough to pivotally interconnect forward mounting structure. The rearward end portions of the side beams each define similar fastener holes 24 to receive nut-bolt fastener 25 therebetween to journal depth control wheel 26 between the forward portions of side beams 21. The depth control wheel 26 preferably is journaled by means of bearing 27 carried thereby to provide free rotation of and greater durability for the wheel. The depth control wheel preferably has a smooth peripheral cylindrical surface 26a and may have concave sides for additional strength and self-cleaning.

Forward pivotal mounting structure 11 provides a U-shaped fastening bracket formed by similar side elements 30 spaced to fit between the adjacent surfaces of side beams 21 and structurally interconnected in their upper portions by upper plate 31. The lower medial portion of side elements 30 each define similar cooperating holes 36 to receive nut-bolt fastener 37 which extends through holes 23 in the side beams 21 and holes 36 in the side elements 30 of the fastening bracket to pivotally interconnect the fastening bracket and side beams. The lateral portions of upper plate 31 each define spaced fastener holes 32 to accept nut-bolt fasteners 33 extending upwardly therethrough and spacedly thereabove. Upper fastening plate 34 is of size and configuration similar to upper plate 31 of the pivotal mounting structure. The upper fastening plate defines lateral fastener holes 35 spaced to cooperate with holes 32 in the upper fastening plate to allow passage of fastener 33 therethrough to carry a portion of the opener beam 19 between fastening plate 34 and upper plate 31 to allow fastening of the forward pivotal mounting structure on the forward portion of opener beam 19 or on a portion of seeder frame 15 in a releasable fashion and without requiring any structural modification of the seeder structure.

Figure 4:
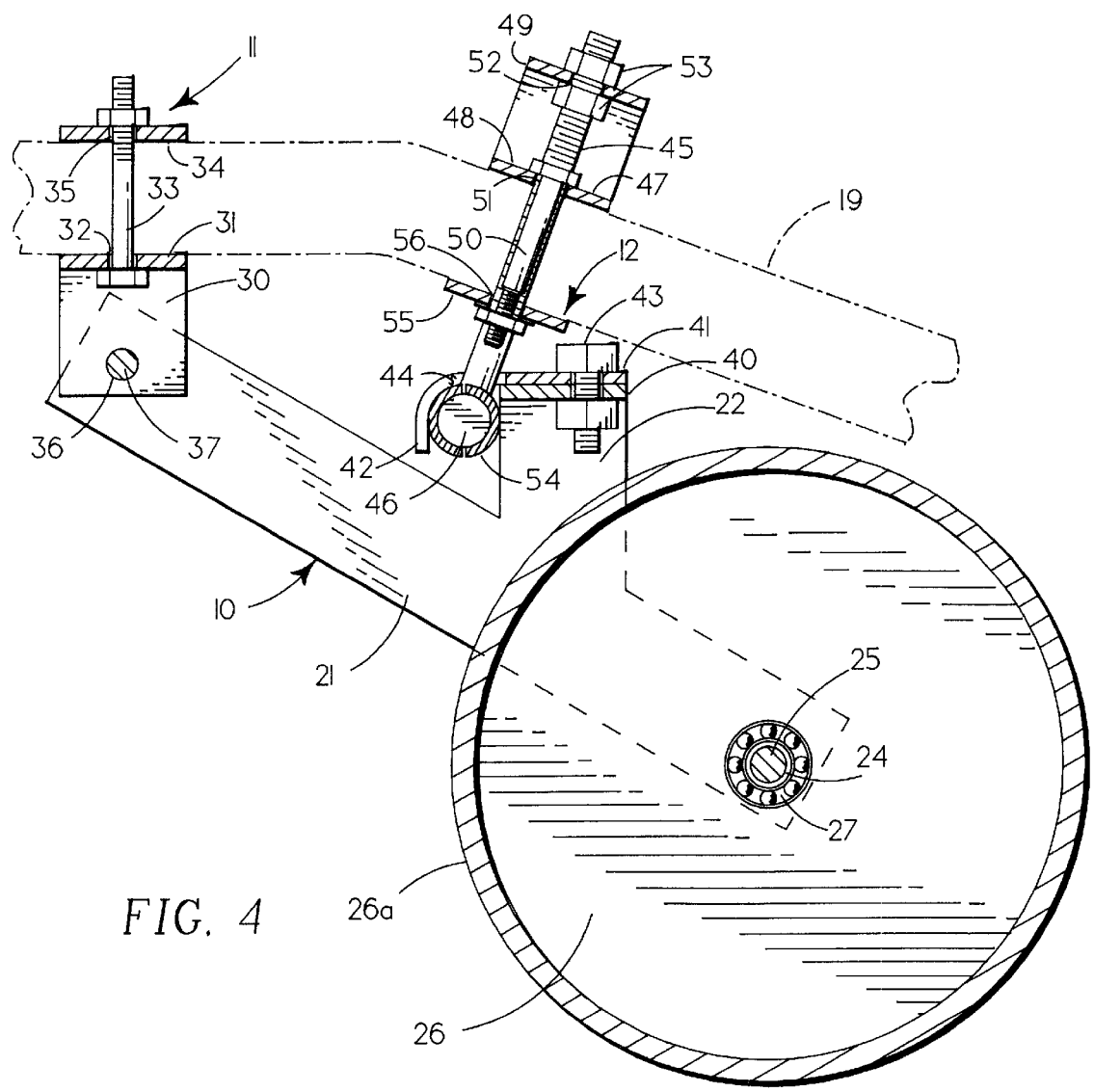
FIG. 4 is an enlarged medial vertical cross-sectional view of the depth control structure of FIG. 2, taken on the line 4—4 thereon in the direction indicated by the arrows.

Medial adjustment structure 12 provides beam plate 40 extending between the upper portions of the medial adjustment legs 22 of the side beams 21 in structural connection therewith. The upper surface of plate 40 carries adjustment bolt fastening plate 41 extending spacedly forwardly of the adjustment legs 22 to define downwardly turned forward end portion 42 to maintain an adjustment bolt fastening rod between the adjustment leg 22 and downturn portion 42 of the adjustment bolt fastening plate 41 as seen particularly in FIG. 4. The adjustable bolt fastening plate 41 is positionally maintained on the upper surface of beam plate 40 by at least one nut-bolt fastener 43 extending through cooperating holes defined in both plates to fastenably interconnect the plates. The undersurface of the forward downturned portion 42 of the adjustment bolt fastening plate structurally carries one-half of split bushing 54 and the forward edges of the medial adjustment legs 22 carry the other half portion of the bushing 54 to allow releasable positioning and positional maintenance of an adjustment bolt fastening rod in the bushing for limited pivotal motion.

Adjustment bolt 45 structurally carries cylindrical fastening rod 46, of a length substantially equal to the lateral width of the adjustment bolt fastening rod bushing 54, extending in perpendicular orientation on each side of the adjustment bolt 45 for pivotal carriage of the fastening rod in the bushing. The adjustment bolt 45 extends upwardly from fastening rod 46 through slot 44 defined in the laterally medial, forward portion 42 of the fastening plate 41 a spaced distance to adjustably communicate through a fastening bracket supported on opener beam 19 of seeder 13.

The adjustment structure fastening bracket provides lower fastening plate 55 with a lateral length sufficient to fastenably engage the lower surface of a portion of opener beam 19 on which the plate is supported. The fastening plate 55 defines laterally spaced holes to receive nut-bolt fasteners 50 that extend upwardly through appropriately positioned holes defined in similar upper fastening plate 47 to allow releasable fastening of a portion of opener beam 19 between the two fastening plates 55, 47. The upper fastening plate 47 structurally carries two similar laterally spaced upstanding adjustment bolt bracket legs 48 which in turn structurally carry upper adjustment bolt bracket plate 49. The lower fastening plate 55 defines medial hole 56, upper fastening plate 47 defines medial hole 51 and the upper adjustment bolt bracket plate 49 defines medial hole 52, all to cooperate to allow passage of the adjustment bolt 45 through the plates for adjustable interconnection with the adjustment bracket plate by nuts 53 threadedly carried on the adjustment bolt above and below the upper plate 49. With this structure the adjustment fastening bracket may be positioned about an opener beam 19 extending between lower fastening plate 55 and upper fastening plate 47 and there fastened by means of fasteners 50 so that the vertical position of the depth wheel 26 relative to an opener beam 19 may be determined by adjustment of nuts 53 on the adjustment bolt 45 when the control structure is carried in operative position on a seeder.

Having thusly described the structure of my depth control mechanism, its operation may be understood.

A depth control structure as specified is formed for association with the openers 18 of a seed drill 13 of the nature described on which my device is to be used. Each depth control structure is attached to the opener beam 19 of an associated opener for support thereon in appropriate position with depth control wheel 26 at an elevation approximately coplanar with the lower portion of the associated opener forwardly of the opener so that the depth control wheel does not interfere with functioning of the associated opener.

The pivotal mounting structure 11 of each depth control structure is fastened upon the forward portion of the rearwardly extending opener beam 19 or a part of the seeder frame 15 by fastening that support element between upper plate 31 of the U-shaped fastening bracket and upper fastening plate 34 by appropriate adjustment of fasteners 33. The adjustment structure is interconnected with opener beam 19 by fastening the medial downwardly angulated portion of that beam between lower fastening plate 55 and upper fastening plate 47 of the adjustment structure fastening bracket. With this interconnection of my depth control structure and an opener beam, the depth control structure will move vertically responsive to vertical motion of the opener beam in the same amount as the vertical motion of the opener structure carried by that beam. It is to be noted that it is possible to mount the pivotal mounting structure 11 on a secondary member of the seeder frame 15 that does not move relative to the associated opener, if the adjustment structure is mounted on the opener beam as illustrated in FIG. 1.

With my depth control structure mounted as described, the vertical position of depth control wheel 26 is adjusted by means of nuts 53 on adjustment bolt 45 to an appropriate vertical position relative to the associated opening structure. The depth of penetration of each opener into the soil and consequently the depth of seed placement is mechanically determined for each opener by contact of the depth control wheel with the surface of the earth forming the seed bed and is not dependent upon secondary conditions that must be sensed and are not necessarily related to the actual depth of opener penetration into the earth.

The depth of planting is substantially determined by the amount of vertical extension of the opener below the lower portion of the depth control wheel. The actual penetration of the opening structure in a particular soil is related to other factors, such as the nature of the soil being penetrated, the compaction of that soil, its density, moisture content, physical constituency and the like. Generally the actual penetration of the opening structure in the earth ultimately requires an empirical determination for the positioning of the depth control wheel. The empirical determination of this positioning is readily accomplish by simple trial even by non-experienced workers that are not familiar with the historical use of the depth control structure or of any of its particularities.

It is to be noted that my depth control structure may be easily positioned on many seeders of present day commerce without modification of either the seeder or the depth control structure. The depth control structure is automatically laterally adjusted for appropriate positioning relative to the serviced opener, whether the opener be laterally adjustable in position or laterally fixed on a seeder frame, by reason of its method of interconnection.

It is further to be noted that my depth control structures may be readily placed and moved on a seed drill to allow use of the depth control structures on a plurality of seed drills or allow removal from a particular seeder if their functions are not desired.

The foregoing description of my invention is necessarily of a detailed nature so that a specific embodiment of it might be set forth as required, but it is to be remembered that various modifications of detail, rearrangement and multiplication of parts might be resorted to without departing from its spirit, essence or scope.

Having thusly described my invention, what I desire to protect by Letters Patent, and What claim is:

1. A depth control structure for openers of a seeder having a single simple unitary frame with at least one forward laterally extending beam carrying for pivotal vertical motion plural, laterally spaced and rearwardly and downwardly extending opener beams each journalling an opener in a rearward portion for seed placement and at least one wheel for locomotion over the earth by a powering vehicle, comprising in combination:

an elongate body having forward, medial and rearward portions, with a depth control wheel journaled in the rearward portion of the body and means defined in the medial portion of the body for supporting adjustment structure;

mounting structure carried in the forward portion of the body for releasably mounting the body for vertically pivotal motion on a seeder forwardly of an opener structure carried by an opener beam to extend rearwardly below and spacedly adjacent to the opener structure; and said adjustment structure being carried by the body for adjustable interconnection with the opener beam forwardly of the opening structure and rearwardly of the mounting structure, said adjustment structure having means for adjusting the vertical position of the rearward portion of the body relative to the opener beam to determine the vertical position of the control wheel relative to the opener.

2. The depth control structure of claim 1 wherein the means for adjusting the vertical position of the body relative to the opener beam comprise a fastening bracket carried by the opener beam interconnected by an adjustment bolt pivotally mounted on the body with at least one adjustment nut carried by the adjustment bolt to regulate the distance between the fastening bracket and the body.

3. The depth control structure of claim 1 further characterized by the body comprising two similar laterally spaced beams journalling the depth control wheel therebetween and structurally interconnected by at least one rigid member extending between the laterally spaced beams.

4. The depth control structure of claim 3 further characterized by the mounting structure comprising a U-shaped fastening bracket pivotally carried between the two laterally spaced beams and carrying at least one upstanding fastener to interconnect an upper fastening plate thereon for releasably fastening the opener beam between the fastening bracket and the upper fastening plate.

5. A depth control structure for openers of a seeder having a single simple unitary frame pivotally carrying for vertical motion plural laterally spaced rearwardly and downwardly extending pener beams, each said opener beam journalling an opener in a rearward portion for seed placement and plural spaced wheels for locomotion over the earth by a powering vehicle, comprising in combination:

an elongate body formed by spaced laterally adjacent body beams, each body beam having forward, medial and rearward portions, with a depth control wheel journaled in the rearward portion of the body and an upstanding adjustment leg defined in the medial portion of the body for support of adjustment structure;

forward mounting structure pivotally carried in the forward portion of the body for releasably pivotally mounting the body on an opener beam forwardly of the opening structure to extend rearwardly below the opening beam to position the depth control wheel forwardly adjacent the opener structure; and adjustment structure carried by the spaced laterally adjacent body beams to extend thereabove for releasable interconnection with the opener beam forwardly of the opener carried thereby and rearwardly of the forward mounting structure, said adjustment structure having means for adjusting the vertical position of the body relative to the opener beam to determine the vertical position of the depth control wheel relative to the opener.

6. The depth control structure of claim 5 wherein the means for adjusting the vertical position of the body relative to the opener beam comprise a fastening bracket releasably carried by the opener beam and interconnected by an adjustment bolt pivotally mounted on the body, with at least one adjustment nut carried by the adjustment bolt to regulate the distance between the fastening bracket and the body.

* * * * *